United States Patent
Lampl et al.

(10) Patent No.: US 10,865,906 B2
(45) Date of Patent: Dec. 15, 2020

(54) VALVE FOR CONTROLLING A FLUID

(71) Applicant: MSG Mechatronic Systems GmbH, Wies (AT)

(72) Inventors: Ewald Lampl, Wies (AT); Hans-Jörg Gasser, Eibiswald (AT)

(73) Assignee: MSG MECHATRONIC SYSTEMS GMBH, Wies (AT)

( * ) Notice: Subject to any disclaimer, the term of this patent is extended or adjusted under 35 U.S.C. 154(b) by 3 days.

(21) Appl. No.: 16/123,811

(22) Filed: Sep. 6, 2018

(65) Prior Publication Data

US 2019/0072201 A1   Mar. 7, 2019

(30) Foreign Application Priority Data

Sep. 7, 2017   (EP) .................................... 17189960

(51) Int. Cl.
*F16K 31/06*   (2006.01)

(52) U.S. Cl.
CPC ........ *F16K 31/0675* (2013.01); *F16K 31/061* (2013.01); *F16K 31/0617* (2013.01); *F16K 31/0624* (2013.01)

(58) Field of Classification Search
CPC ............... F16K 31/0675; F16K 31/061; F16K 31/0617; F16K 31/0624
See application file for complete search history.

(56) References Cited

U.S. PATENT DOCUMENTS

| 5,687,765 A * | 11/1997 | You | B60T 8/364 137/627.5 |
| 7,717,128 B2 * | 5/2010 | Pataki | F15B 13/044 137/596.1 |
| 7,847,661 B2 * | 12/2010 | Jotter | B29C 45/281 335/220 |
| 2016/0305571 A1 * | 10/2016 | Meisiek | F16K 31/0686 |

FOREIGN PATENT DOCUMENTS

DE   20 2010 004 556   8/2010
GB           2089478 A *   6/1982

* cited by examiner

*Primary Examiner* — Kevin R Barss
(74) *Attorney, Agent, or Firm* — Workman Nydegger

(57) ABSTRACT

A valve, comprising a housing with an inlet and an outlet, a closure, which is displaceable between a first position and a second position, wherein in the first position, a flow path from the inlet to the outlet is formed or interrupted, and wherein the flow path is interrupted or formed in the second position, and an actuation unit having a coil and an armature. The armature displaces the closure between the two positions subject to a current applied to the coil, wherein the armature has a cone, wherein a force on the armature is modifiable via an ascent of the cone.

10 Claims, 4 Drawing Sheets

VALVE FOR CONTROLLING A FLUID

The invention relates to a valve for controlling a fluid with the characteristics of the preamble of claim 1.

Utility Model DE 20 2010 004 556 U1 discloses a valve for controlling a fluid comprising a housing with a tubular cavity to which three connections are connected. Within the tubular cavity there is a cylindrical closure having several grooves and being displaceable between a first position and a second position. In the first position of the closure, there is a flow path between two of the three connections, and in the second position, there is a flow path between other two of the three connections, while the flow of fluid to the residual third connection is prevented in each case. In addition, the valve has an actuation unit comprising a stationary coil with a housing and a movable armature. The armature is flat, coupled with the closure and arranged on the face of the coil within the cavity, the armature being surrounded by the fluid. The armature displaces the closure subject to a current applied to the coil between the first and the second position.

It has been shown to be disadvantageous with regard to the known valve that the magnetic force acting on the armature decreases exponentially with the distance from the stationary part of the electromagnet, so that only a relatively low stroke may be realized.

Valves are known that have a dynamic sealing for separating the drive compartment and the fluid compartment. A disadvantage here is the low wear resistance of dynamic seals compared to static ones. Static seal means that no part in mechanical contact with the seal is moved with regard to the seal. With a dynamic seal, a movable part moves along the seal. In a different type of valves, the armature is separated from the coil by a thin core guide tube. The core guide tube has the purpose to separate the fluid compartment from the coil compartment so that the coil may not be damaged by aggressive fluids. In case of contamination, the resulting small gaps lead to a risk of armature blockage.

In the valve known from Utility Model DE 20 2010 004 556 U1 it is neither obvious from the drawings nor mentioned in the description that the coil is protected against direct contact with the fluid. Direct contact between the fluid and the coil may lead to material weakening of an insulation layer surrounding the wire of the coil and consequently to a short circuit, especially if the fluid is a caustic or an aggressive fluid.

It is thus one object of embodiments of the present invention to provide a valve that overcomes the disadvantages of the state of the art, has a simple design, and shows a long service life.

Embodiments of the present invention achieves the object mentioned above by means of a device with the characteristics of the characterizing part. Preferred embodiments of the invention are described in the dependent claims.

In the valve according to embodiments of the invention, the coil is formed outside of a cavity that is provided in a housing of the valve and is at least partially filled with fluid if fluid is supplied to the valve, and the coil is connected with the housing of the valve statically sealed against the cavity. By arranging the coil outside of the cavity and statically sealing it against the cavity, the coil does not come into contact with the fluid. Consequently, the coil has a very long service life.

In addition, the valve according to embodiments of the invention has an essentially disc-shaped armature, the armature having a circular elevation at a side facing the coil or the core. In this connection, essentially disc-shaped means that the form of the armature may deviate slightly from the shape of a disc. A jacket interior surface of the elevation and/or a jacket exterior surface of the armature is/are preferably formed conically in the direction of the coil. In this connection, the jacket exterior surface may either be a jacket exterior surface of the disc-shaped part of the armature or a jacket exterior surface of the circular elevation or a jacket exterior surface that extends over the disc-shaped part of the armature and the circular elevation. With the valve according to embodiments of the invention, the force acting on the armature via a magnetic field of the coil, by means of which the armature displaces the at least one closure from the second position to the first position and/or from the first position to the second position, consequently changes only slightly within the stroke range, which allows a larger stroke range.

By forming a cone at the armature and the pole core, the force progression is manipulated via the stroke and may be adjusted so that no excessive forces occur. In contrast, with a flat armature and pole core, as e.g. implemented in DE202010004556U1, an undesirably large force occurs at a small distance, which decreases exponentially with an increasing distance. With the measure according to embodiments of the invention of providing at least one cone, the force progression with changing distances may be adjusted via the cone angle (which defines the ascent of the cone) while maintaining a constant energization and magnet design. With a valve according to embodiments of the invention, in which the coil is designed as a solenoid switch, the force progression is adjusted so that in combination with the spring a nearly constant force progression is provided. With a valve according to embodiments of the invention, in which the coil is formed as a proportional solenoid (adjustment of a certain position depending on the current strength), the force progression is adjusted to be falling, i.e. the force even increases with an increasing distance.

Changing the ascent of the cone also leads to the advantage that in the valve according to embodiments of the invention, the force progression acting on the armature is modifiable over a path that the armature travels from the first position to the second position and/or in reverse as a function of the respective distance even when a constant current is applied to the coil. For example, a progressive force progression may be adjusted through a corresponding ascent of the cone.

Suitably, the actuation unit has a core arranged within the coil. An end of the core facing the armature preferably has a cone, and by changing the ascent of the cone the force with which the armature displaces the at least one closure from the second position to the first position and/or from the first position to the second position may also be changed.

Advantageously, a flow rate through the at least one flow opening and the actuation force, which is necessary to displace the closure from the second position to the first position and/or from the first position to the second position, are modifiable via the geometry of the at least one flow opening depending on the geometry of the at least one closure. In this connection, the flow opening may, for example, have a changing cross-section or an oval shape, and the closure is correspondingly adapted to the shape of the flow opening.

The closure preferably has a flat shape, and a sealing surface of a flow opening of the valve that the closure closes in the second position also has a flat shape. However, it is also possible that the closure has a cylindrical shape and comprises recesses in order to close or open different flow paths depending on the position of the closure. In addition, it is also possible that the valve has any other shape known to persons skilled in the art.

Suitably, the at least one closure is formed by a slider, the armature displacing the slider between the first position and the second position essentially perpendicularly to the flow path subject to the current applied to the coil. However, it is also possible that the at least one closure is formed by a plug, the armature displacing the at least one closure between the first position and the second position essentially in the direction of or against a flow path subject to the current applied to the coil. This provides the advantage that the valve may be optimally adapted to and designed for an intended purpose and requirements resulting therefrom.

Suitably, the valve according to embodiments of the invention has two plugs and associated flow openings, the plugs being fixed with regard to each other at a distance by a shaft that is displaceably arranged within the housing and firmly attached to the armature at one of its ends. A first one of the two plugs is arranged in front of a first one of the flow openings in the direction of the flow path, and a second one of the two plugs is arranged after a second one of the two flow openings in the direction of the flow path. This provides the advantage that a force for moving the plug from a first position to a second position and/or in reverse is minimal.

Preferably, the valve according to embodiments of the invention has at least one spring that is supported against the housing and biases the at least one closure into the first position by means of a spring force, wherein the armature moves the at least one closure against the spring force from the first position in the direction of the second position when a current is applied to the coil. Such a valve is particularly suitable for the use in coolant circuits because the spring keeps the valve open and guarantees continuous cooling, for example of combustion engines of motor vehicles. When no cooling is required, e.g. due to very low ambient temperatures, the closure is displaced from the first position to the second position against the spring force by energizing the coil so that the valve is closed.

Preferably, the at least one closure is displaceable to an intermediate position by means of the armature subject to the current applied to the coil so that a flow through the at least one flow opening is modifiable. Such a valve according to embodiments of the invention can, for example, be used as a proportional valve, e.g. to appropriately control the passage of a coolant in a motor vehicle for cooling a combustion engine.

Suitably, a permanent magnet is provided at the at least one closure, and a magnetic field sensor is provided in the cavity that detects a position of the at least one closure. This is particularly advantageous in valves according to embodiments of the invention in which the armature is displaceable to an intermediate position as a function of a current applied to the coil because it is thus always possible to determine the position of the armature.

Preferably, the at least one closure is supported by a shaft that is displaceably supported within the housing and at one end firmly attached to the armature. Preferably, the shaft is displaceably supported by two spaced bearings in the housing and the core. This has the advantage that jamming of the shaft during a movement of the closure from the first position to the second position can be avoided.

The valve according to embodiments of the invention may, for example, be used for controlling a fluid formed by water, coolant, oil, liquids from the food industry, etc.

Preferred embodiments of the device according to embodiments of the invention are described in more detail below and with reference to the figures.

Figure 1:
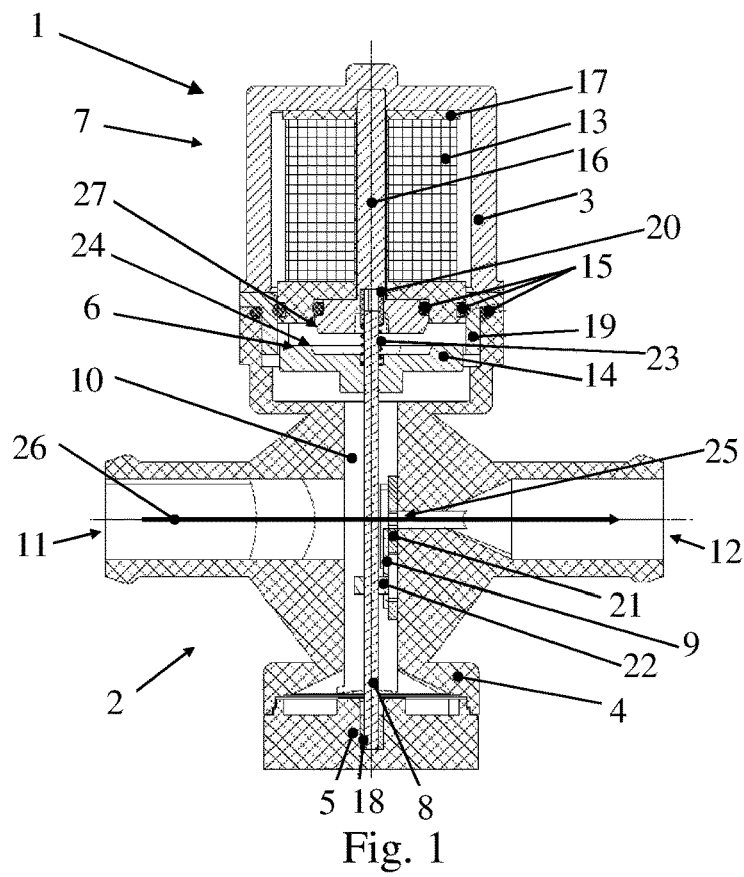
FIGS. 1 and 2 show a first embodiment of a valve according to embodiments of the invention in a lateral sectional view with a non-energized and an energized coil.
Figure 2:
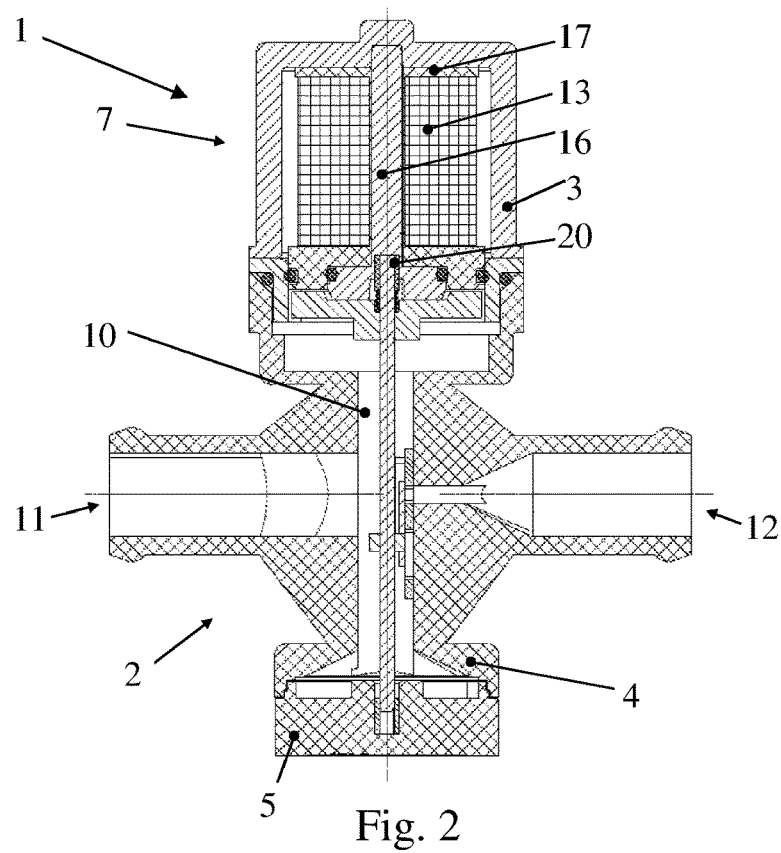

FIGS. 1 and 2 show a first embodiment of a valve 1 according to embodiments of the invention for controlling a fluid in a lateral sectional view. Valve 1 comprises a housing 2 and an actuation unit 7. The actuation unit 7 comprises a coil housing 3 connected to the housing 2 via a flange 19, a coil 13 arranged within the coil housing 3, a coil body 17, a core 16, a sliding sleeve 20, and an armature 14. Coil 13 is surrounded by coil body 17 and may be connected to a power source via cables that are not shown. Coil 13 surrounds core 16, which is connected to core housing 3. Armature 14 is disc-shaped and has a circular elevation 6, wherein a cone is formed at the circular elevation 6 at its jacket interior surface 24.

Core 16 has a cone 27 at an end facing the armature 14.

O-rings 15 are arranged between housing 2, flange 19, and core 16, which O-rings statically seal coil 13 against a cavity 10 formed in housing 2. This provides the advantage that coil 13 does not come into contact with a fluid passing through valve 1.

Housing 2 consist of a first housing element 4 and a second housing element 5. An inlet 11 and an outlet 12 are formed at the first housing element 4, which are opposed to each other and each lead into cavity 10. At the entrance of outlet 12 into cavity 10, a seal seat 21 is formed, which has a flow opening 25.

Within cavity 10, a shaft 8 is arranged that is displaceably supported within a sliding sleeve 18 formed in the second housing element 5 and sliding sleeve 20 formed within core 16, and firmly attached to armature 14.

A closure 9 is formed at shaft 8, which closure 9 is connected to shaft 8 via an entrainer 22 and is formed by a slider.

Between armature 14 and sliding sleeve 20, a spring 23 is provided.

If coil 13 is in a non-energized state, spring 23 biases shaft 8 and thus closure 9 in a first position. In the first position, closure 9 opens flow opening 25 so that a flow path 26 through valve 1 is formed along which a fluid supplied to valve 1 through inlet 11 may flow. See FIG. 1. As seen in FIGS. 1 and 2, the fluid flows around armature 14.

If coil 13 is in an energized state, coil 13 pulls armature 14 against the spring force of spring 23 and moves shaft 8 and thus closure 9 from the first position to a second position. In the second position, flow opening 25 is closed by closure 9, so that flow path 25 through valve 1 is interrupted. See FIG. 2. Advantageously, entrainer 22 is shaped so that the closure is easily displaceable against shaft 8, so that in the second position, closure 9 is pressed against seal seat 21 by a fluid supplied to valve 1 through inlet 11 and flow opening 25 is consequently hermetically sealed.

It should be mentioned that depending on the current applied to coil 13 and the design of the cone, closure 9 is also displaceable to intermediate positions between the first position and the second position, by means of which the flow through flow opening 25 may be modified.

Figure 3:
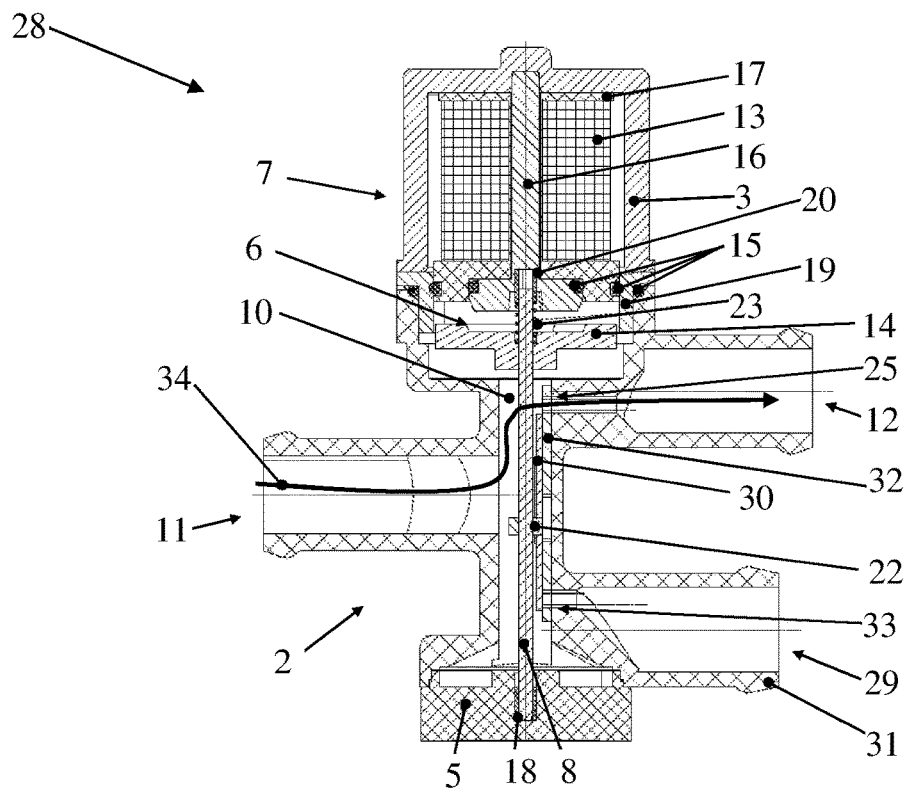
FIGS. 3 and 4 show a further embodiment of the valve according to embodiments of the invention in a lateral sectional view with a non-energized and an energized coil.
Figure 4:
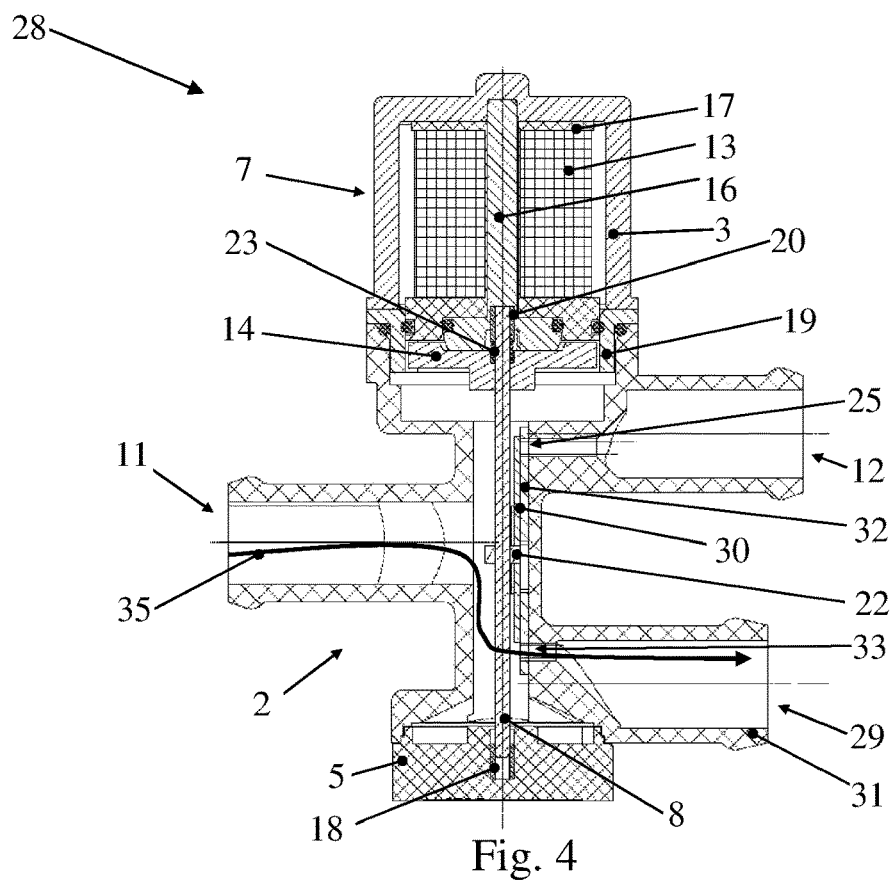

FIGS. 3 and 4 show a further embodiment of the valve 28 according to the invention for controlling a fluid in a lateral sectional view. Valve 28 differs from valve 1 according to FIGS. 1 and 2 in that valve 28 has a housing 2 with a first housing element 31 comprising a second outlet 29, so that the shape of housing element 31 of housing 2 of valve 28 is different from the shape of housing element 4 of housing 2 of valve 1 according to FIGS. 1 and 2. Elements that are the same in valve 28 and in valve 1 according to FIGS. 1 and 2 are marked with the same reference numbers. In the region of the entrance of outlet 12—in the following referred to as first outlet 12—and second outlet 29 into cavity 10, a seal seat 32 is formed that has flow openings 25 and 33 for each of the outlets 12 and 29, respectively.

In a non-energized state of coil 13 spring 23 presses shaft 8 and thus closure 30 into a first position. In the first position, closure 30 opens flow opening 25 and closes flow opening 33, so that a first flow path 34 through valve 28 is formed along which a fluid supplied to valve 28 through inlet 11 may flow to first outlet 12. See FIG. 3.

If coil 13 is in an energized state, coil 13 pulls armature 14 against the spring force of spring 23 and moves shaft 8 and thus closure 30 from the first position to a second position. In the second position, closure 30 opens flow opening 33 and closes flow opening 25, so that a second flow path 35 through valve 28 is formed along which a fluid supplied to valve 28 through inlet 11 may flow to second outlet 29. See FIG. 4.

It should be mentioned that depending on the current applied to coil 13, closure 30 is also displaceable to intermediate positions, wherein in the intermediate position flow opening 25 as well as flow opening 33 are, depending on the design, either partially or completely opened by closure 30.

Figure 5:
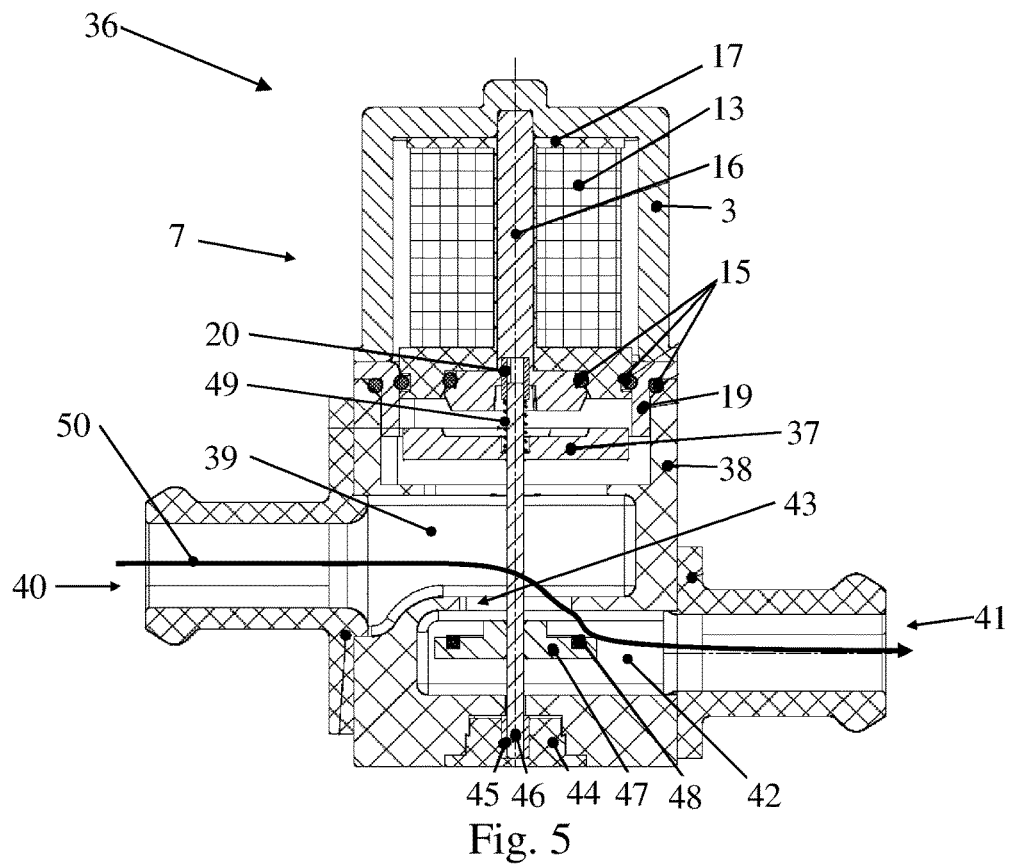
FIGS. 5 and 6 show a further embodiment of the valve according to embodiments of the invention in a lateral sectional view with a non-energized and an energized coil.
Figure 6:
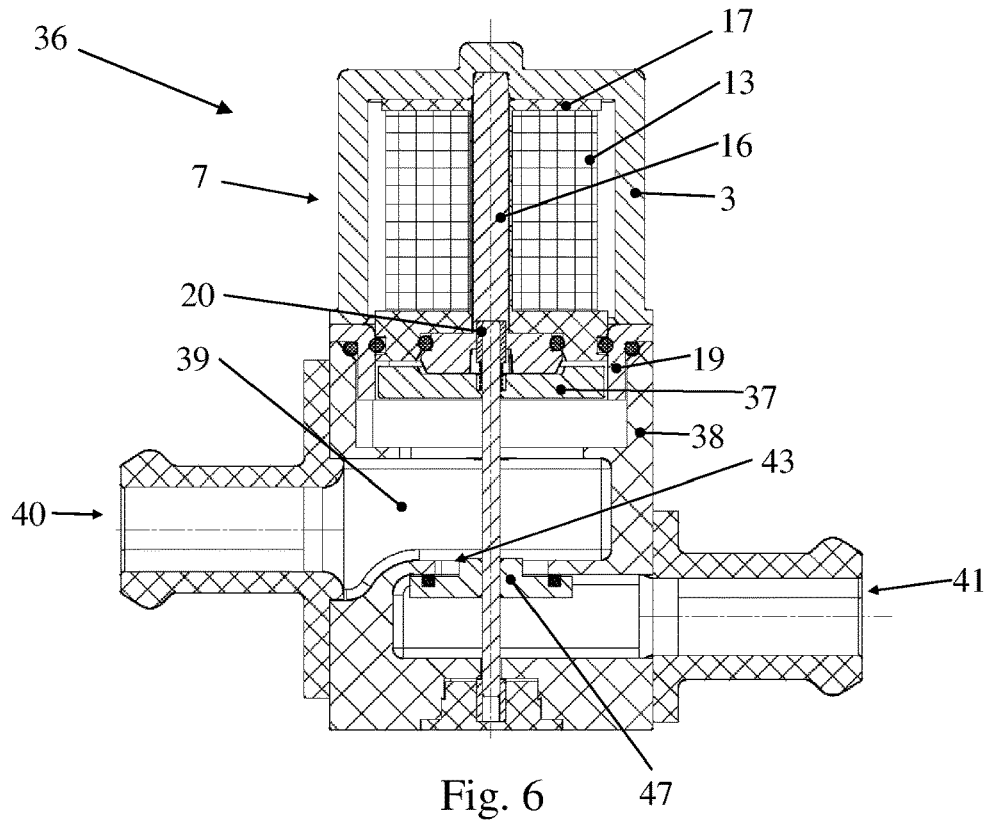

FIGS. 5 and 6 show a further embodiment of the valve 36 according to embodiments of the invention for controlling a fluid in a lateral sectional view. Valve 36 comprises an actuation unit 7 that has the same design as armature 7 of valve 1 from FIGS. 1 and 2, except for armature 37. The shape of armature 37 differs slightly from armature 14 of valve 1 according to FIG. 1.

Valve 36 comprises a housing 38 being connected to actuation unit 7 and having a cavity 39 in which armature 37 is arranged. An inlet 40 and an outlet 41 are connected to housing 38, wherein inlet 40 leads directly into cavity 39 and outlet 41 is connected to cavity 39 via a channel 42 and a flow opening 43 forming a valve seat.

A bearing 44 with a sliding sleeve 45 is formed within the housing. A shaft 46 is displaceably supported in sliding sleeve 45 and in sliding sleeve 20. Shaft 46 is at its ends connected to armature 37. A spring 49 is provided between sleeve 20 and armature 37.

At shaft 46, a closure 47 is provided, which is formed by a plug and has an O-ring 48.

If coil 13 is in a non-energized state, spring 49 presses shaft 46 and thus closure 47 into a first position. In the first position, closure 47 opens flow opening 43, so that a first flow path 50 through valve 36 is formed along which a fluid supplied to valve 36 through inlet 40 may flow to outlet 41. See FIG. 5.

If coil 13 is in an energized state, coil 13 pulls armature 37 against the spring force of spring 49 and moves shaft 46 and thus closure 47 from the first position to a second position. In the second position, closure 47 opens flow opening 43 and closes flow opening 43, so that flow path 50 is interrupted. See FIG. 6.

In valve 36, closure 47 is displaced from the first position to the second position essentially against, and from the second position to the first position essentially in the direction of the flow path.

Figure 7:
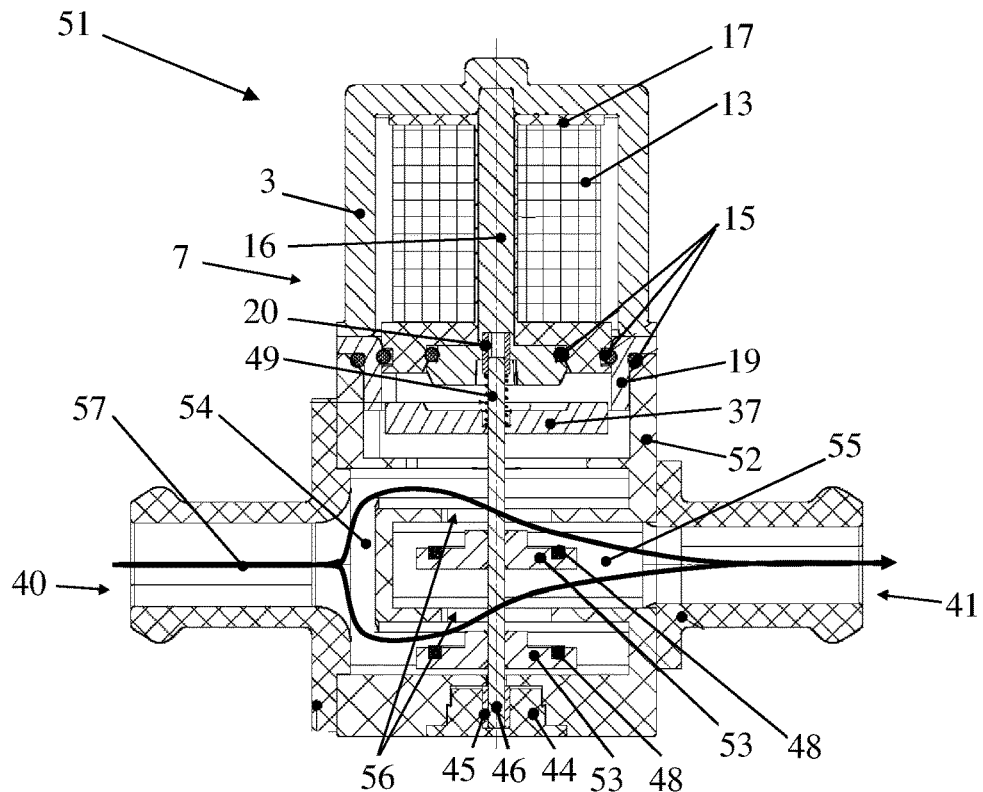
FIGS. 7 and 8 show a further embodiment of the valve according to embodiments of the invention in a lateral sectional view with a non-energized and an energized coil.
Figure 8:
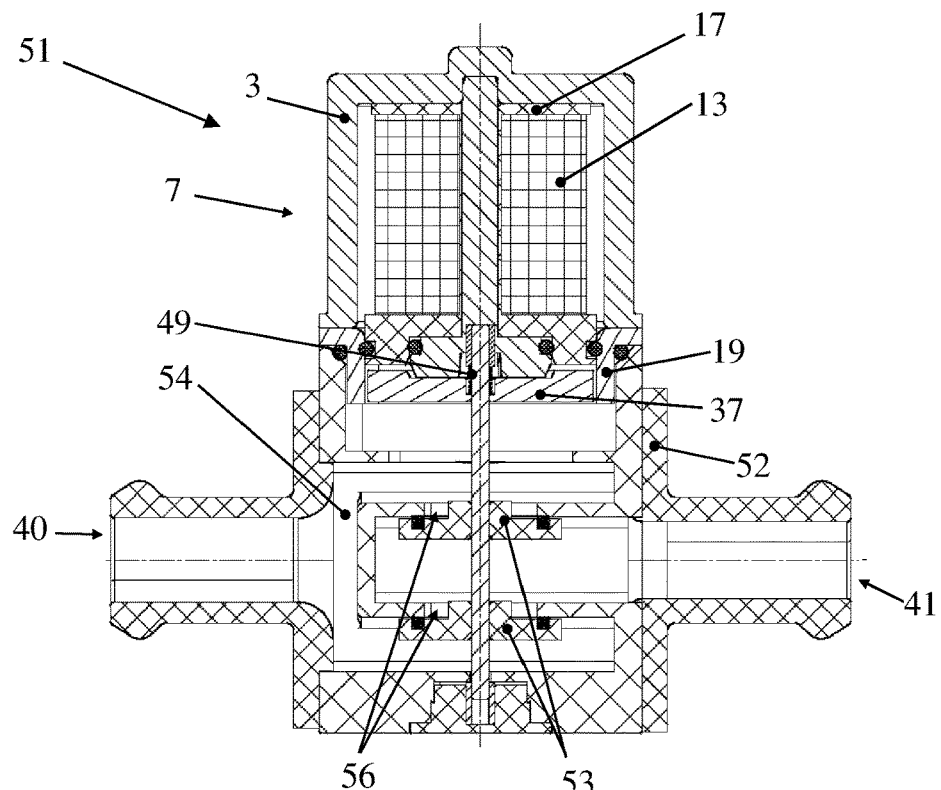

FIGS. 7 and 8 show a further embodiment of the valve 51 according to embodiments of the invention for controlling a fluid in a lateral sectional view. Valve 51 differs from valve 36 according to FIGS. 5 and 6 in that in valve 51, housing 52 is formed so that inlet 40 and outlet 41 are arranged opposite each other. In addition, housing 52 differs from housing 38 of valve 36 according to FIGS. 5 and 6 by its interior design. Elements that are the same in valve 51 and valve 36 according to FIGS. 5 and 6 are marked with the same reference numbers.

Valve 51 has two closures 53 auf. Housing 52 has a cavity 54 into which inlet 40 leads. The outlet leads into cavity 54 via a channel 55 and two flow openings 56 each forming a valve seat.

If coil 13 is in a non-energized state, spring 49 presses shaft 46 and thus closures 53 into a first position. In the first position, closures 53 open flow openings 56, so that a first flow path 57 through valve 51 is formed along which a fluid supplied to valve 51 through inlet 40 may flow to outlet 41. See FIG. 7.

If coil 13 is in an energized state, coil 13 pulls armature 37 against the spring force of spring 49 and moves shaft 46 and thus closures 53 from the first position to a second position. In the second position, closures 53 close flow openings 56, so that flow path 57 is interrupted. See FIG. 8.

In valve 36, when closures 53 are moved from the first position to the second position or in reverse, one of the closures 53 is displaced in the direction of the flow path and the other one of the closures 53 is displaced against the flow path. This has the advantage that a force for moving closures 53 is minimal because it only needs to be large enough to counteract the spring force.

The invention claimed is:

1. A valve for controlling a fluid, the valve comprising
    a housing with a cavity having at least one flow opening, wherein at least one inlet and at least one outlet are connected to the cavity,
    at least one closure displaceable between a first position and a second position, wherein in the first position, a flow path from the at least one inlet via the at least one flow opening through the cavity to the at least one outlet is formed, and wherein in the second position, the at least one closure closes the at least one flow opening so that the flow path is interrupted, and
    an actuation unit having a coil, a core housing, a core at least partially surrounded by the coil, and an armature, wherein the armature is coupled to the at least one closure and arranged on the face of the core in the cavity, wherein fluid flowing through the cavity flows around the armature and wherein the armature displaces the at least one closure between the first position and the second position subject to a current applied to the coil,
    wherein the coil is arranged outside of the cavity and is connected to the housing statically sealed against the cavity, and the armature is disc-shaped, wherein the armature has a circular elevation at a side facing the core, wherein a jacket interior surface of the elevation and/or a jacket exterior surface of the armature is cone-shaped, wherein via a current applied to the coil a force applied to the armature is modifiable, with which the armature displaces the at least one closure from the second position to the first position and/or from the first position to the second position, wherein a force progression of the force is influenceable via an ascent of the cones depending on a distance between the armature and the core, wherein the at least one closure is formed by at least one plug, wherein the armature displaces the at least one closure between the first position and the second position in the direction of or against the flow path subject to the current applied to the coil, wherein the valve further includes two plugs and associated flow openings, the plugs being fixed with regard to each other at a distance by a shaft that is displaceably arranged within the housing and at one of its ends firmly attached to the armature, wherein a first of the two plugs is arranged in front of a first one of the flow openings in the direction of the flow path, and a second one of the two plugs is arranged after a second one of the two flow openings in the direction of the flow path.

2. The valve according to claim 1 wherein the core has a cone at the end facing the armature, wherein by changing the ascent of the cone, the force progression of the force is modifiable depending on the distance between the armature and the core, by means of which the armature displaces the at least one closure from the second position to the first position and/or from the first position to the second position.

3. The valve according to claim 1, wherein the at least one inlet is opposed to the at least one outlet.

4. The valve according to claim 1, wherein the valve has at least one spring that is supported against the core and biases the at least one closure into the first position by means of spring force, wherein the armature moves the at least one closure against the spring force from the first position in the direction of the second position when a current is applied to the coil.

5. The valve according to claim 1, wherein the at least one closure is supported by a shaft that is supported within the housing and the core and is firmly attached to the armature.

6. The valve according to claim 1, wherein a flow rate through the at least one flow opening and an actuation force, which is necessary to displace the closure from the second position to the first position and/or from the first position to the second position, are modifiable via the geometry of the at least one flow opening subject to the geometry of the at least one closure.

7. The valve according to claim 1, wherein the at least one closure is displaceable to an intermediate position by means of the armature subject to the current applied to the coil so that a flow through the at least one flow opening is controllable.

8. The valve according to claim 1, wherein the valve has two outlets connected to the cavity and that a flow opening is formed at each entrance of an outlet into the cavity, wherein in the first position, the at least one closure opens a first outlet of the outlets and closes a second outlet of the outlets so that a flow path from at least one inlet through the cavity to the first outlet is formed, and wherein in the second position, the at least one closure closes the first outlet and opens the second outlet so that a flow path from at least one inlet through the cavity to the second outlet is formed.

9. The valve according to claim 7, wherein with a corresponding design of the closure with regard to flow openings, the at least one closure in the intermediate position can adjust the allocation of the flow to the respective flow openings.

10. The valve according to claim 1, wherein the actuation unit comprises a flange.

* * * * *